United States Patent
Mizuno

(10) Patent No.: US 7,073,549 B2
(45) Date of Patent: Jul. 11, 2006

(54) BUS OR TRUCK TIRE HAVING CAP/BASE TREAD

(75) Inventor: Yoichi Mizuno, Kobe (JP)

(73) Assignee: Sumitomo Rubber Industries Ltd., Kobe (JP)

( * ) Notice: Subject to any disclaimer, the term of this patent is extended or adjusted under 35 U.S.C. 154(b) by 225 days.

(21) Appl. No.: 10/180,329

(22) Filed: Jun. 27, 2002

(65) Prior Publication Data

US 2003/0079816 A1    May 1, 2003

(30) Foreign Application Priority Data

Jun. 29, 2001    (JP) ............................. 2001-199025

(51) Int. Cl.
*B60C 1/00*    (2006.01)
*B60C 11/00*    (2006.01)

(52) U.S. Cl. .................................. 152/209.5; 524/492
(58) Field of Classification Search ............. 152/209.5; 524/492, 493
See application file for complete search history.

(56) References Cited

U.S. PATENT DOCUMENTS 4,835,209 A * 5/1989 Kitagawa et al. ........... 524/507
5,225,011 A    7/1993 Takino et al.

FOREIGN PATENT DOCUMENTS

| EP | 0 708 136 A1 | 4/1996 |
| EP | 0 738 614 A1 | 10/1996 |
| EP | 0 942 041 A1 | 9/1999 |
| JP | 10-95204 * | 4/1998 |
| JP | 11-165502 A | 6/1999 |
| JP | 2001-172435 A | 6/2001 |

OTHER PUBLICATIONS

Mark et al, Science and Technology of Rubber, pp. 432-437, 1994.*

* cited by examiner

*Primary Examiner*—Steven D. Maki
(74) *Attorney, Agent, or Firm*—Birch, Stewart, Kolasch & Birch, LLP

(57) ABSTRACT

The present invention provides a rubber composition for base tread having reduced heat build-up characteristics and excellent reinforcing property, and a pneumatic tire using the rubber composition for the base tread. The rubber composition for base tread of the present invention comprises 30 to 40 parts by weight of carbon black having iodine adsorption amount of at least 115 mg/g, 5 to 10 parts by weight of silica and 1.2 to 2.2 parts by weight of sulfur based on 100 parts by weight of a rubber component, wherein the total amount of the carbon black and the silica is at most 45 parts by weight. The pneumatic tire of the present invention is obtained by using 20 to 80% by volume of a base tread based on the total volume of a tread comprising the rubber composition.

1 Claim, No Drawings

BUS OR TRUCK TIRE HAVING CAP/BASE TREAD

BACKGROUND OF THE INVENTION

The present invention relates to a rubber composition for base tread and a pneumatic tire using the same. Particularly, the present invention relates to a rubber composition for base tread having reduced heat build-up characteristics and excellent reinforcing property, and a pneumatic tire using the rubber composition for base tread.

In recent years, demand for improvement of tire life is increasing, and there are developments such as improvement of abrasion resistance of cap tread rubber and increase of tread width. However, such attempts are now resulting in problems that a tire has increased heat build-up characteristics to cause separation of tread from belt owing to the heat build-up, and that rolling resistance of a tire is increased.

As a means for alleviating these problems, a general technique is to form a two-layer structure tread comprising cap and base, using a low heat build-up rubber for the base tread. However, reinforcing property of a usual low heat build-up rubber is poor, and therefore abrasion resistance decreases when the base tread is exposed at a late stage of abrasion, causing poor abrasion appearance (chipping) or crack at the bottom of the groove. Therefore, the low heat build-up rubber can be only used in such an amount that it is not exposed to the surface even if abrasion occurs, and lowering effect on heat build-up remains small.

In order to meet the demand for long life tires, primal task is to develop a rubber composition having reduced heat build-up characteristics and high reinforcing property, achieving a practical use of low heat build-up tire having a structure with increased base volume.

SUMMARY OF THE INVENTION

In order to achieve low heat build-up characteristics, carbon or silica having large particle diameters has been added to conventional base tread compounds. However, when the volume of base tread is increased to such an extent that the base tread is exposed at the last stage of abrasion for the purpose of achieving further reduced heat build-up characteristics and increased fuel efficiency, durability has been decreased, and such increase was difficult. Therefore, these conventional tread compounds were not easily applied to bus or truck tires used under particularly severe conditions.

As a result of studies to solve the above problems, a compound having both reduced heat build-up characteristics and high reinforcing ability has been found by using carbon black having a large specific surface area, which provides excellent abrasion resistance and elongation at break, together with silica which provides reduced heat build-up characteristics and excellent elongation at break, and by optimizing these amounts and the amount of sulfur.

Furthermore, the cap/base ratio of the tread has also been optimized.

That is, the present invention relates to a rubber composition for base tread comprising, 30 to 40 parts by weight of carbon black having iodine adsorption amount of at least 115 mg/g, 5 to 10 parts by weight of silica and 1.2 to 2.2 parts by weight of sulfur based on 100 parts by weight of a rubber component, wherein the total amount of the carbon black and the silica is at most 45 parts by weight.

The present invention also relates to a pneumatic tire having a base tread and a cap tread in which 20 to 80% of the total volume of the base tread and the cap tread is a base tread comprising the rubber composition.

DETAILED DESCRIPTION

The rubber composition of the present invention is obtained by compounding particular amounts of carbon black having a large specific surface area, silica and sulfur to a rubber component.

As the rubber component, natural rubber (NR) and/or isoprene rubber (IR) are preferable from the viewpoint of heat build-up characteristics. It is more preferable that NR and/or IR are used in a total amount of at least 90% by weight.

Examples of other useful rubber components include butadiene rubber (BR), styrene-butadiene rubber (SBR), isoprene rubber (IR), butyl rubber (IIR), acrylonitrile-butadiene rubber, chloroprene rubber, ethylene-propylene rubber, ethylene-propylene-diene rubber, styrene-isoprene rubber, styrene-isoprene-butadiene rubber, isoprene-butadiene rubber, chlorosulfonated polyethylene, acrylic rubber, epichlorohydrine rubber, polysulfide rubber, silicone rubber, fluorine rubber, urethane rubber, bromides of isobutylene-p-methyl styrene copolymer and the like.

Referring to carbon black, one having an iodine adsorption amount of at least 115 mg/g is compounded. It is preferable that the lower limit of iodine adsorption amount is 120 mg/g and the upper limit of iodine adsorption amount is 180 mg/g. When the iodine adsorption amount is less than 115 mg/g, abrasion resistance, abrasion appearance and elongation at break are inferior. On the other hand, when the iodine adsorption amount is more than 180 mg/g, heat build-up characteristics tend to increase.

Concrete examples of carbon black are N110, N220, N219, N134 and the like.

The amount of carbon black used in the present invention is 30 to 40 parts by weight based on 100 parts of the rubber component. When the amount of carbon black is less than 30 parts by weight, abrasion resistance is insufficient. When the amount is more than 40 parts by weight, heat build-up characteristics increase. Preferably, the upper limit of the amount of carbon black is 38 parts by weight and the lower limit of the amount of carbon black is 32 parts by weight.

With respect to silica, one having a BET adsorption amount of 100 to 240 $m^2/g$ is preferable. When the BET adsorption amount of silica is less than 100 $m^2/g$, abrasion resistance and reinforcing properties such as chipping resistance tend to be inferior. When the BET adsorption amount of silica is more than 240 $m^2/g$, heat build-up characteristics tend to increase.

The amount of silica is 5 to 10 parts by weight based on 100 parts by weight of the rubber component. When the amount of silica is less than 5 parts by weight, low heat build-up characteristics and chipping resistance (elongation at break) are inferior. When the amount is more than 10 parts by weight, abrasion resistance decreases. Preferably, the upper limit of the amount of silica is 8 parts by weight and the lower limit of the amount of silica is 5 parts by weight.

The total amount of carbon black and silica is at most 45 parts by weight, preferably at most 43 parts by weight based on 100 parts by weight of the rubber component. When the total amount is more than 45 parts by weight, heat build-up characteristics increase. The total amount is preferably at least 35 parts by weight, more preferably at least 38 parts by weight based on 100 parts by weight of the rubber component. When the total amount is less than 35 parts by weight, abrasion resistance tends to decrease.

The amount of sulfur is 1.2 to 2.2 parts by weight based on 100 parts by weight of the rubber component. When the amount of sulfur is less than 1.2 parts by weight, heat build-up characteristics increase. When the amount of sulfur is more than 2.2 parts by weight, abrasion resistance and chipping resistance decrease. Preferably, the upper limit of the amount of sulfur is 2.0 parts by weight and the lower limit of the amount of the sulfur is 1.4 parts by weight.

The rubber composition for base tread of the present invention may contain a usual amount of additives or components commonly used for producing rubber compositions for tire tread, if necessary, in addition to the rubber component, carbon black, silica and sulfur. Concrete examples of the additives and the components are process oils such as paraffin process oil, naphthene process oil and aromatic process oil; vulcanization accelerators such as guanidine, aldehyde-amine, thiourea, thiuram, dithiocarbamate and xandate compounds; cross-linking agents such as radical initiators including organic peroxide compounds and azo compouds, oxime compounds, nitroso compounds and polyamine compounds; reinforcing agents such as high impact polystyrene resins and phenol-formaldehyde resins; antioxidants such as amine derivatives including diphenylamine derivatives or p-phenylenediamine derivatives, quinoline derivatives, hydroquinone derivatives, monophenols, diphenols, thiobisphenols, hinderedphenols and phosphorous acid ester; waxes; stearic acids; zinc oxides; softeners; and plasticizers.

The pneumatic tire of the present invention has a tread which comprises a base tread (inner layer) and cap tread (surface layer). A tread having such a structure can be prepared by a method which comprises kneading the respective components of base tread and cap tread by using usual processing apparatus such as a roll, a Banbury mixer or a kneader to form each sheet, and laminating the sheets to give a pre-determined shape, or by a method which comprises introducing the components into at least two extruders respectively, so that two layers are formed at the end of head of the extruders. The pneumatic tire of the present invention has a base tread comprising the above rubber composition for base tread.

The volume ratio of cap tread to base tread (cap tread/base tread) is 80/20 to 20/80. When the volume of the base tread is less than 20% by volume, improvement of heat build-up characteristics and rolling resistance is insufficient. When the volume of the base tread is more than 80% by volume, the tire to be obtained has remarkably decreased abrasion resistance, and costs are also increased. Preferably, the upper limit of the volume of the base tread is 70% by volume and the lower limit is 30% by volume.

The loss tangent (tan δ) of the entire tread is preferably 0.080 to 0.120. The tan δ of the entire tread is calculated as follows:

tan δ of the entire tread=(tan δ of cap tread)×(volume ratio of cap tread)+(tan δ of base tread)×(volume ratio of base tread)

When the tan δ of the entire tread is less than 0.080, reinforcing ability tends to be inferior. When the tan δ of the entire tread is more than 0.120, improvement of heat build-up characteristics tends to be insufficient. More preferably, the upper limit thereof is 0.100 and the lower limit thereof is 0.085.

EXAMPLES

The present invention is explained in detail based on Examples below, but not limited thereto. "Part(s)" and "%" in the following examples mean "part(s) by weight" and "% by weight", respectively, unless otherwise specified.

Examples 1 to 8 and Comparative Examples 1 to 12 (Rubber Compositions)

(Compounded Components)
NR: RSS#3
BR: BR150B available from Ube Industries, Ltd.
Carbon black 1: Seast 9 (N110) available from Tokai Carbon Co., Ltd. (iodine adsorption amount: 142 mg/g)
Carbon black 2: DIABLACK I (N220) available from Mitsubishi Chemical Corporation (iodine adsorption amount: 118 mg/g)
Carbon black 3: Seast N (N330) available from Tokai Carbon Co., Ltd. (iodine adsorption amount: 70)
Silica: Ultrasil VN 3 available from Degussa Co.
Silane coupling agent: bis (3-triethoxysilylpropyl) tetrasulfene (Si69) available from Degussa Co.
Wax: Sannowax available from Ohuchi Shinko Kagaku Kogyo Co. Ltd.
Antioxidant: Ozonone 6C available from Seiko Chemicals Co., Ltd.
Stearic acid: KIRI available from NOF Corporation
Zinc oxide: Ginrei R available from Toho Zinc Co. Ltd.
Sulfur: sulfur available from Tsurumi Chemicals Co., Ltd.
Vulcanization accelerator: Nocceler NS available from Ohuchi Shinko Kagaku Kogyo Co. Ltd. (N-tert-butyl-2-benzothiazolylsulfenamide)

(Preparation Method)

The basic compound shown in Table 1 was compounded with each compound shown in Tables 2 and 3 except for sulfur and vulcanization accelerator. The mixture was kneaded by using a Banbury mixer at about 150° C. for five minutes. To the obtained rubber composition were added sulfur and vulcanization accelerator, and the composition was kneaded at about 80° C. for five minutes by a twin-screw open roll The obtained rubber composition for base tread was molded and vulcanized at 150° C. for 30 minutes under a pressure of 20 kgf to prepare a truck tire having a size of 11R22.5. For the cap tread, an all-season tread rubber was used (compound: 80 parts of the NR (RSS#3), 20 parts of the BR (BR150B), 54 parts of the carbon black (N110), 2 parts of the antioxidant, 1 part of the wax, 2 parts of stearic acid, 5 parts of zinc oxide, 1.2 parts of sulfur and 1.5 parts of the vulcanization accelerator). Test pieces were prepared from the base tread rubber composition of the new tire, and evaluated as follows:

(Test Method)

1) Loss Tangent (Elasticity Test)

Test pieces were prepared from the base tread rubber composition of the new tire. Loss tangent (tan δ) of each test piece at 60° C. was measured by using a viscoelastometer made by Iwamoto Corporation under the condition of a frequency of 10 Hz and a dynamic strain of 1.0%. The smaller the tan δ the lower and more excellent the heat build-up characteristics, and the more excellent the rolling resistance. When the tan δ is at most 0.100, it is evaluated that heat build-up characteristics is sufficiently low.

2) Abrasion Resistance Test

Test pieces were prepared from the base tread rubber composition of the new tire. Using a Lambourne abrasion tester made by Iwamoto Corporation, volume loss (abrasion amount) of each test piece was measured under the condition of a surface rotation speed of 50 m/minute, a load of 5.0 kg, a drop rate of sand of 15 g/minute, a slip ratio of 50% and a testing time of 4 minutes. The measured volume loss was represented as an index to the volume loss value of Comparative Example 1 as 100 according to the following equation (abrasion resistance index). The larger the index, the more excellent the abrasion resistance. When the index is at least 110, it is evaluated that abrasion resistance is excellent.

(Lambourne abrasion index)=(volume loss value of Comparative Example 1)÷(volume loss value of each compound)×100

3) Test of Elongation at Break (Tensile Test)

Tensile test was carried out by using a No. 3 dumbbell specimen prepared from the base tread rubber composition of the new tire according to JIS-K6251 to measure elongation at break $E_B$ (%). $E_B$ was represented as an index to the value of elongation at break of Comparative Example 1 as 100 according to the following equation (index of elongation at break). The larger the index, the more excellent the elongation at break and chipping resistance in particular. When the index is at least 110, it is evaluated that chipping resistance is excellent.

(index of elongation at break)=(elongation at break of each compound)÷(elongation at break of Comparative Example 1)×100

(Test Results)

Test results are shown in Tables 2 and 3. In Comparative Examples 1 to 4 where carbon black or silica was solely compounded as a filler, desired balanced performances could not be obtained.

In Comparative Example 5 where carbon black having a low iodine adsorption amount was used, desired balanced performances could not be obtained.

Contrary to these, in Examples 1 and 2 where carbon black having a low iodine adsorption amount and silica were compounded as fillers, desired balanced performances could be obtained.

Comparison between Examples 2 to 4 and Comparative Examples 6 and 7 shows that it is preferable to compound silica in an amount of 5 to 10 parts.

Comparison between Examples 2, 5 and 6 and Comparative Examples 8 to 10 shows that it is preferable to compound carbon black in an amount of 30 to 40 parts and that the total amount of silica and carbon black is at most 45 parts by weight.

Comparison between Examples 2, 7 and 8 and Comparative Examples 11 and 12 shows that it is preferable to compound sulfur in an amount of 1.2 to 2.2 parts.

TABLE 1

| Compounded component | Amount (Part by weight) |
| --- | --- |
| NR | 100 |
| Antioxidant | 2 |
| Wax | 2 |
| Stearic acid | 2 |
| Zinc oxide | 5 |
| Vulcanization accelerator | 1.5 |

TABLE 2

| | Ex. 1 | Ex. 2 | Com. Ex. 1 | Com. Ex. 2 | Com. Ex. 3 | Com. Ex. 4 | Com. Ex. 5 | Ex. 3 | Ex. 4 | Com. Ex. 6 | Com. Ex. 7 |
| --- | --- | --- | --- | --- | --- | --- | --- | --- | --- | --- | --- |
| Compound (part by weight) | | | | | | | | | | | |
| Carbon black 1 | — | 35 | — | — | 43 | — | — | 35 | 35 | 35 | 35 |
| Carbon black 2 | 35 | — | — | 43 | — | — | — | — | — | — | — |
| Carbon black 3 | — | — | 43 | — | — | — | 35 | — | — | — | — |
| Silica | 8 | 8 | — | — | — | 43 | 8 | 5 | 10 | 3 | 12 |
| Coupling agent | 0.8 | 0.8 | — | — | — | 4.3 | 0.8 | 0.5 | 1 | 0.3 | 1.2 |
| Sulfur | 1.6 | 1.6 | 1.6 | 1.6 | 1.6 | 1.6 | 1.6 | 1.6 | 1.6 | 1.6 | 1.6 |
| Carbon black + Silica | 43 | 43 | 43 | 43 | 43 | 43 | 43 | 40 | 45 | 38 | 47 |
| Properties of rubber | | | | | | | | | | | |
| 1) Loss tangent | 0.075 | 0.087 | 0.074 | 0.090 | 0.106 | 0.060 | 0.065 | 0.085 | 0.094 | 0.080 | 0.102 |
| 2) Abrasion resistance index | 110 | 117 | 100 | 112 | 119 | 98 | 97 | 114 | 121 | 109 | 124 |
| 3) Index of elongation at break | 114 | 117 | 100 | 109 | 114 | 132 | 107 | 121 | 114 | 124 | 112 |

TABLE 3

| | Ex. 5 | Ex. 6 | Com. Ex. 8 | Com. Ex. 9 | Com. Ex. 10 | Ex. 7 | Ex. 8 | Com. Ex. 11 | Com. Ex. 12 |
| --- | --- | --- | --- | --- | --- | --- | --- | --- | --- |
| Compound (part by weight) | | | | | | | | | |
| Carbon black 1 | 30 | 40 | 25 | 40 | 45 | 35 | 35 | 35 | 35 |
| Carbon black 2 | — | — | — | — | — | — | — | — | — |

TABLE 3-continued

|  | Ex. 5 | Ex. 6 | Com. Ex. 8 | Com. Ex. 9 | Com. Ex. 10 | Ex. 7 | Ex. 8 | Com. Ex. 11 | Com. Ex. 12 |
|---|---|---|---|---|---|---|---|---|---|
| Carbon black 3 | — | — | — | — | — | — | — | — | — |
| Silica | 8 | 5 | 8 | 8 | 8 | 8 | 8 | 8 | 8 |
| Coupling agent | 0.8 | 0.5 | 0.8 | 0.8 | 0.8 | 0.8 | 0.8 | 0.8 | 0.8 |
| Sulfur | 1.6 | 1.6 | 1.6 | 1.6 | 1.6 | 1.2 | 2.2 | 1 | 2.5 |
| Carbon black + Silica | 38 | 45 | 33 | 48 | 53 | 43 | 43 | 43 | 43 |
| Properties of rubber | | | | | | | | | |
| 1) Loss tangent | 0.072 | 0.097 | 0.060 | 0.107 | 0.121 | 0.097 | 0.080 | 0.104 | 0.072 |
| 2) Abrasion resistance index | 114 | 122 | 106 | 126 | 131 | 124 | 110 | 130 | 104 |
| 3) Index of elongation at break | 121 | 117 | 129 | 113 | 107 | 124 | 112 | 128 | 106 |

Examples 9 to 14 and Comparative Examples 13 to 15 (Characteristics of Tire)

(Preparation Method)

Truck tires having a size of 11R22.5 were prepared, whose tread comprises cap tread and base tread in each volume ratio shown in Table 4. Vulcanization was carried out under the condition of 150° C. and a pressure of 20 kgf for 30 minutes. An all-season tread rubber was used for the cap tread (index of elongation at break: 130, loss tangent: 0.130 in the above evaluation).

(Evaluation Method)

4) Rolling Resistance

Rolling resistance of each tire was measured under the condition of a speed of 80 km/h, an air pressure of 800 kPa and a load of 30 kN. Each value was represented as an index to the rolling resistance value of Comparative Example 1 as 100 according to the following equation (rolling resistance index). The larger the index, the more excellent the rolling resistance and fuel efficiency. When the index is at least 103, it is evaluated that fuel efficiency is excellent.

(rolling resistance index)=(rolling resistance value of Comparative Example 1)÷(rolling resistance value of each compound)×100

5) Tire Heat Build-up Test

Each tire was mounted on a 10 ton truck and run for 10 minutes at a speed of about 80 km/h to measure temperature of the upper part of the breaker edge. Each heat build-up temperature value was represented as an index to the heat build-up temperature value of Comparative Example 1 as 100 according to the following equation (heat build-up index). The larger the index, the lower the heat build-up characteristics and the more preferable. When the index is at least 103, it is evaluated that heat build-up characteristics is sufficiently low.

(heat build-up index)=(heat build-up temperature value of Comparative Example 1)÷(heat build-up temperature value of each compound)×100

6) Abrasion appearance of base tread

Each tire was mounted on a 10 ton truck and run for 200,000 km, so that the base tread was exposed. Abrasion appearances (chipping levels) were compared. The number of flaws with a length of at least 1 mm was counted per 100 cm² of the base tread surface. When the number of flaws is at most 10, in particular at most 5, it is evaluated that the appearance level is equal to cap tread and there is no problem.

(Evaluation Results)

Results are shown in Table 4.

Table 4 shows that heat build-up characteristics are large in Comparative Example 13 without base tread, Comparative Example 15 where the base tread had a large loss tangent because too large an amount of carbon black having a large iodine adsorption amount was compounded, and in Example 14 whose base tread ratio was small, because the loss tangent of the entire tread is too large.

In addition, it is found that there is a problem with abrasion appearance of base tread in Comparative Example 14 where the base tread had a small loss tangent because carbon black having a small iodine adsorption amount was compounded.

TABLE 4

|  | Ex. 9 | Ex. 10 | Ex. 11 | Ex. 12 | Ex. 13 | Ex. 14 | Com. Ex. 13 | Com. Ex. 14 | Com. Ex. 15 |
|---|---|---|---|---|---|---|---|---|---|
| Cap tread | 60 | 60 | 80 | 40 | 20 | 90 | 100 | 60 | 60 |
| Base tread | | | | | | | | | |
| Rubber composition of Com. Ex. 1 | — | — | — | — | — | — | — | 40 | — |
| Rubber composition of Com. Ex. 3 | — | — | — | — | — | — | — | — | 40 |
| Rubber composition of EX. 1 | 40 | — | 20 | 60 | 80 | 10 | — | — | — |
| Rubber composition of EX. 2 | — | 40 | — | — | — | — | — | — | — |
| tanδ: (tanδ of cap) × (volume ratio of cap) + (tanδ of base) × (volume ratio of base) | 0.108 | 0.113 | 0.119 | 0.097 | 0.086 | 0.125 | 0.130 | 0.108 | 0.120 |
| Properties of tire | | | | | | | | | |
| 4) Rolling resistance index | 107 | 104 | 105 | 108 | 110 | 101 | 100 | 106 | 102 |
| 5) Heat build-up index | 106 | 105 | 104 | 107 | 111 | 101 | 100 | 104 | 102 |

TABLE 4-continued

|  | Ex. 9 | Ex. 10 | Ex. 11 | Ex. 12 | Ex. 13 | Ex. 14 | Com. Ex. 13 | Com. Ex. 14 | Com. Ex. 15 |
|---|---|---|---|---|---|---|---|---|---|
| 6) Abrasion appealance of base tread (number of flaws) | 5 | 2 | 7 | 6 | 7 | 7 | 2 | 21 | 4 |

The rubber composition for base tread of the present invention has reduced heat build-up characteristics and excellent reinforcing property. Therefore, abrasion resistance is not lowered even if base tread is exposed at the last stage of abrasion. Accordingly, it is possible to increase the volume of the base tread compared with conventional cases, and in addition, heat build-up characteristics of tire can be reduced.

What is claimed is:

1. A bus or truck tire having a cap/base tread including a cap tread and a base tread, wherein the base tread is from 20 to 80% of the total volume of the cap/base tread, wherein the base tread comprises a rubber composition comprising,
    30 to 38 parts by weight of carbon black having an iodine adsorption amount of at least 142 mg/g,
    5 to 10 parts by weight of silica and
    1.2 to 2.2 parts by weight of sulfur based on 100 parts by weight of a rubber component,
    wherein the total amount of the carbon black and the silica is from 35 to 43 parts by weight.

* * * * *